United States Patent
Tsai et al.

(10) Patent No.: US 11,809,528 B2
(45) Date of Patent: *Nov. 7, 2023

(54) TERMINAL HARDWARE CONFIGURATION SYSTEM

(71) Applicant: Stripe, Inc., South San Francisco, CA (US)

(72) Inventors: Hwai Sian Tsai, Ma on Shan (HK); Chi Wah Lo, Hong Kong (HK)

(73) Assignee: STRIPE, INC., South San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/052,334

(22) PCT Filed: May 9, 2019

(86) PCT No.: PCT/CN2019/086235
§ 371 (c)(1),
(2) Date: Nov. 2, 2020

(87) PCT Pub. No.: WO2019/214687
PCT Pub. Date: Nov. 14, 2019

(65) Prior Publication Data
US 2021/0173902 A1    Jun. 10, 2021

Related U.S. Application Data

(60) Provisional application No. 62/668,866, filed on May 9, 2018.

(51) Int. Cl.
*G06F 21/12*        (2013.01)
*G06F 8/61*         (2018.01)
(Continued)

(52) U.S. Cl.
CPC .............. *G06F 21/121* (2013.01); *G06F 8/61* (2013.01); *G06F 21/44* (2013.01); *G06Q 20/20* (2013.01); *G06F 2221/0724* (2013.01)

(58) Field of Classification Search
CPC ............. G06F 12/0888; G06F 12/1408; G06F 2212/1052; G06F 3/1454; G06F 21/121;
(Continued)

(56) References Cited

U.S. PATENT DOCUMENTS 5,708,709 A * 1/1998 Rose .................... G06F 8/61
                                                  705/52
9,268,364 B2   2/2016 Parker
(Continued)

FOREIGN PATENT DOCUMENTS

CN    106304040 A    1/2017
CN    106462428 A    2/2017
(Continued)

OTHER PUBLICATIONS

Lili Yu et al.; The Application of Hybrid Encryption Algorithm in Software Security; IEEE; pp. 762-765; retrieved on May 24, 2023 (Year: 2012).*
(Continued)

*Primary Examiner* — S. Sough
*Assistant Examiner* — Cuong V Luu
(74) *Attorney, Agent, or Firm* — Womble Bond Dickinson (US) LLP

(57) ABSTRACT

Installing and running an application for a terminal are described. A method for installing and running the application includes uploading an application to an application store. The method further includes downloading, by a terminal, the application from the application store, wherein the terminal is connected to the application store by a network. Furthermore, the method includes authorizing, by (Continued)

a terminal management server (TMS) coupled to the terminal and the application store via the network, the terminal to install and run the downloaded application.

17 Claims, 9 Drawing Sheets

(51) Int. Cl.
*G06F 21/44* (2013.01)
*G06Q 20/20* (2012.01)

(58) Field of Classification Search
CPC ...... G06F 8/61; G06F 21/44; G06F 2221/072; G06F 21/53; G06F 2221/033; G06F 21/10; G06Q 20/20
See application file for complete search history.

(56) References Cited

U.S. PATENT DOCUMENTS

| | | |
|---|---|---|
| 2005/0172137 A1 | 8/2005 | Hopkins |
| 2005/0193208 A1 | 9/2005 | Charrette et al. |
| 2006/0039566 A1* | 2/2006 | Stark ................. G06F 21/121 380/278 |
| 2006/0075397 A1* | 4/2006 | Kasahara ............. G06F 9/5044 717/170 |
| 2006/0132447 A1 | 6/2006 | Conrad |
| 2008/0091944 A1 | 4/2008 | Mueller et al. |
| 2008/0114685 A1* | 5/2008 | Leong ................. G06Q 30/06 705/51 |
| 2008/0189214 A1 | 8/2008 | Mueller et al. |
| 2010/0064212 A1 | 3/2010 | Snyder |
| 2011/0102328 A1 | 5/2011 | Chen |
| 2011/0260982 A1 | 10/2011 | Trout |
| 2012/0235921 A1 | 9/2012 | Laubach |
| 2013/0234942 A1 | 9/2013 | Yoo et al. |
| 2014/0283092 A1 | 9/2014 | Mowatt et al. |
| 2015/0235024 A1 | 8/2015 | Corrion et al. |
| 2016/0048706 A1* | 2/2016 | Menet ................. G06F 21/82 726/26 |
| 2016/0234625 A1* | 8/2016 | Wang ................. H04L 67/06 |
| 2017/0076099 A1* | 3/2017 | Yao ................. G06F 21/562 |
| 2017/0293769 A1* | 10/2017 | Quinlan ............. G06F 21/6218 |
| 2019/0334718 A1* | 10/2019 | Li ................. H04W 12/0471 |
| 2019/0347414 A1* | 11/2019 | El-Moussa ............. G06F 21/53 |

FOREIGN PATENT DOCUMENTS

| | | | |
|---|---|---|---|
| EP | 3677005 B1 * | 3/2021 | ......... H04L 63/0815 |
| WO | 2016188231 A1 | 12/2016 | |

OTHER PUBLICATIONS

Utsav Banerjee et al.; An Energy-Efficient Reconfigurable DTLS Cryptographic Engine for Securing Internet-of-Things Applications; IEEE; pp. 2339-2352; retrieved on May 24, 2023 (Year: 2019).*

Patent Cooperation Treaty: International Search Report and Written Opinion for PCT/CN2019/086235; Li, Jiang; dated Jul. 26, 2019; 6 pages.

* cited by examiner

| Sandbox Class | For (column 804) | Security Objective (column 805) | Control Means (column 806) |
|---|---|---|---|
| A (row 801) | Payment APP (801, 804) | Allowed access to sensitive data and functions (801, 805) | Relatively loosely restricted sandbox. (801, 806) |
| B (row 802) | Non-Payment APP (802, 804) | No access to sensitive data and functions (802, 805) | block sensitive services and data in addition to sandbox restrictions for class A apps. (802, 806) |
| C (row 803) | Unauthorized APP (803, 804) | Not able to ask card holder to disclose account data and PIN in addition to security objective for class B apps (803, 805) | Warns card holder not to enter account data and PIN regardless of what the app prompt says in addition to sandbox restrictions for class B apps. (803, 806) |

FIG. 8

TERMINAL HARDWARE CONFIGURATION SYSTEM

CROSS-REFERENCE TO RELATED APPLICATIONS

This application is a 371 National Stage of International Application No. PCT/2019/086235, filed May 9, 2019, which claims the benefit of Provisional Application No. 62/668,866, filed May 9, 2018, the disclosures of which are herein incorporated by reference in their entirety.

TECHNICAL FIELD

This disclosure relates to updating of point of sale (PoS) terminals and payment terminals.

BACKGROUND

Smart device based mobile payment systems have become very common in recent years. Examples of these include electronic or digital wallets which store, for example, bank account information, loyalty cards, stored value payment information; and alternative payment methods such as QR code based payment methods. Apart from these consumer side payment applications, merchants are also increasingly making use of smart device based systems in addition to traditional Electronic Funds Transfer Point Of Sale (EFTPOS) systems for payment purposes. Mobile Point of Sale (MPOS) devices such as card reader dongles, and other physical interfaces such as camera and Near Field Communications (NFC) are being increasingly used in addition to traditional EFTPOS systems.

The payment applications or payment "apps" used in such smart device based mobile payment systems are normally deployed and maintained through application stores or marketplaces associated with the smart mobile device Operating System (OS) platforms. The security of such systems poses concerns. The handling of sensitive information within the smart device, such as account data, biometric data, passwords and PINs is one such concern. The authenticity and integrity of the payment applications are another concern. Some issues which need to be handled include:
- Determining if the application downloaded from an application store or application marketplace is authentic,
- Determining if the application is running on a smart device which is acceptable for running such applications, and
- Ensuring that unknown applications (which may perform phishing) and non-payment applications cannot make use of sensitive services and sensitive data.

Furthermore, traditional EFTPOS is evolving into 'smart' EFTPOSs by making use of smart device OS and hardware platforms, so as to exploit the rapid application development and deployment of applications for these platforms. Such smart EFTPOS systems facilitate the support of alternative payment methods and other value added services, and enhance user experience.

Typically payment applications for such smart EFTPOS systems are distributed and managed by the payment platform owners, terminal vendors or acquirers, via Terminal-Management-Servers (TMS) or custom application stores, for full control of security. However, deploying and maintaining applications on a larger scale and in a timely manner with high quality-of-service (QoS) measures such as high up-time and guaranteed throughput, implies high running cost. Typically, these parties do not have the resources and expertise of the smart device OS platform owners to run the stores and mitigate the store's design faults and vulnerabilities.

Thus, it is very desirable to distribute and maintain those applications using the application stores provided by the smart device OS platform owners. In such a case, the following security concerns should be addressed:
- The extra authentication requirements of the applications and application data;
- To limit the payment applications such that these applications only run on the authorized intended EFTPOSs or smart devices used for payment purposes, and not on generic smart devices; and
- To allow other applications to run on the EFTPOS and smart devices used for payment purposes safely.

Currently, basic authentication measures are implemented for the application stores of mobile platforms. FIG. 1 shows a prior art application authentication process. In step 101 the application is posted or uploaded into the application store. In step 102 the user requests a download of the application from the application store. In step 103 the application image is hashed using a hash function on the application store to create a hash value. The resulting hash value is then signed with the application store private key. In step 104 the application image is bundled with the signed application hash and transmitted to the user smart device. In step 105, the OS on the user smart device authenticates the downloaded application, to determine whether it is from the store. The encrypted application hash is decrypted using the application store public key, and the downloaded application image is hashed on the user smart device using the same hash function which is on the application store. The decrypted hash and the hash corresponding to the downloaded application image are compared to verify that the application image has
- authenticity, that is, the application image is real, and
- integrity, that is, the application image is good.

In step 106 the authentication process is carried out. If the downloaded application passes the authentication process in step 106, then in step 107 the application is installed and executed. If not, then in step 108, the application is deleted.

In such cases an application vendor relies on the application store private key and application store public key to ensure the authenticity of the application.

Alternatively, the application vendor can maintain the authenticity of an application by signing it using the application vendor's own private key, and the corresponding application vendor's public key is installed on the user smart device. FIG. 2 shows a prior art process using the application vendor's private and public key. Steps 201-208 of FIG. 2 are similar to steps 101-108 except that:
- in step 203 the hash is signed using the application vendor's private key, and
- in step 205 the user smart device OS decrypts the signed application hash using the application vendor's public key.

Some application stores, such as the GOOGLE® Play store, also provide a means for application vendors to sign their application, instead of only being signed by a GOOGLE® key.

In some situations, both vendor and application store owner require application authentication before installing and running. Then, the application hash is encrypted using both the vendor private key and the application store private key, and decrypted using both the vendor public key and the application store public key. FIG. 3 shows a prior art process for this. Steps 301-308 of FIG. 2 are similar to steps 101-108 of FIG. 1 except that:

in step 303 the hash is encrypted using both the application vendor's private key and the application store private key. This is achieved by, for example, cascading the two encryption processes; and in step 305 the user smart device OS decrypts the signed application hash using the application vendor's public key and the application store public key.

In other cases more than two parties need to sign the application. In these cases, the application goes through more than two encryptions and two authentications instead of just two as shown in FIG. 3. In all of these cases, authentication requires support from the application store and the OS.

Apart from application authentication to enable a smart device to determine whether a downloaded application is real and good, there are cases where the device needs to be further authorized to run the application. For example, certain terminals may not be authorized for running certain applications. Thus, an authorization process is needed in addition to the authentication process. The authorization process ensures that the terminal is authorized to install and run the application.

Such an authorization process is necessary for example, for licensing. It is common, as part of a software registration process which runs on a user smart device, to deliver the licensing key in an out-of-band channel to the user device, and have the user type in the key for activating the application for usage via a remote licensing server of the software vendor. The software vendor then further binds the software license to user smart device hardware addresses such as network interface MAC address.

SUMMARY

A system to install and run an application for a terminal, said system comprising an application store; a terminal management server (TMS); wherein said TMS, application store and terminal are coupled to each other via a network; wherein a vendor uploads an application to said application store, and said terminal downloads said application via said network; and wherein after said downloading by said terminal, said TMS authorizes said terminal to install and run said downloaded application.

A system to install and run an application for a terminal, said system comprising an application store; a terminal management server (TMS); wherein said TMS, application store and terminal are coupled to each other via a network; wherein a vendor uploads an application to said app store, and said terminal downloads said application via said network; wherein said downloaded application is classified into one of a plurality of classes, each of said plurality corresponding to an application class sandbox; and said classification performed based on level of authorization and type of application.

A system to install and run an application for a terminal, said system comprising an application store; a terminal management server (TMS); wherein said TMS, application store and terminal are coupled to each other via a network; wherein a vendor uploads either a patch to an application to said application store, or an upgrade to an application to said application store, and said terminal downloads said patch or said upgrade via said network; and wherein after said downloading by said terminal, said TMS authorizes said terminal to install and run said patch or said upgrade.

A method for installing and running an application for a terminal comprising: uploading an application to an application store; downloading, by a terminal, said application from said application store, wherein said terminal is connected to said application store by a network; and authorizing, by a TMS coupled to said terminal and said application store via said network, said terminal to install and run said downloaded application.

A method for installing and running an application for a terminal comprising: uploading, by a vendor, an application to an application store; downloading, by a terminal, said application from said application store, wherein said terminal is connected to said application store by a network; classifying said downloaded application into one of a plurality of classes, each of said plurality corresponding to an application class sandbox, and said classifying performed based on level of authorization and type of application.

A method for installing and running an application for a terminal comprising: uploading, by a vendor, either a patch to an application to said application store, or an upgrade to an application to said application store; downloading, by a terminal, either said patch or said upgrade from said application store, wherein said terminal is connected to said application store by a network; authorizing, by a TMS coupled to said terminal and said application store via said network, said terminal to install and run either said patch or said upgrade.

BRIEF DESCRIPTION OF THE DRAWINGS

For a more complete understanding, reference is now made to the following description taken in conjunction with the accompanying Drawings in which:

FIG. 8 illustrates an example embodiment of segregation of applications into different classes for application of application class sandboxes based on level of authorization and type of application.

DETAILED DESCRIPTION

Figure 1:
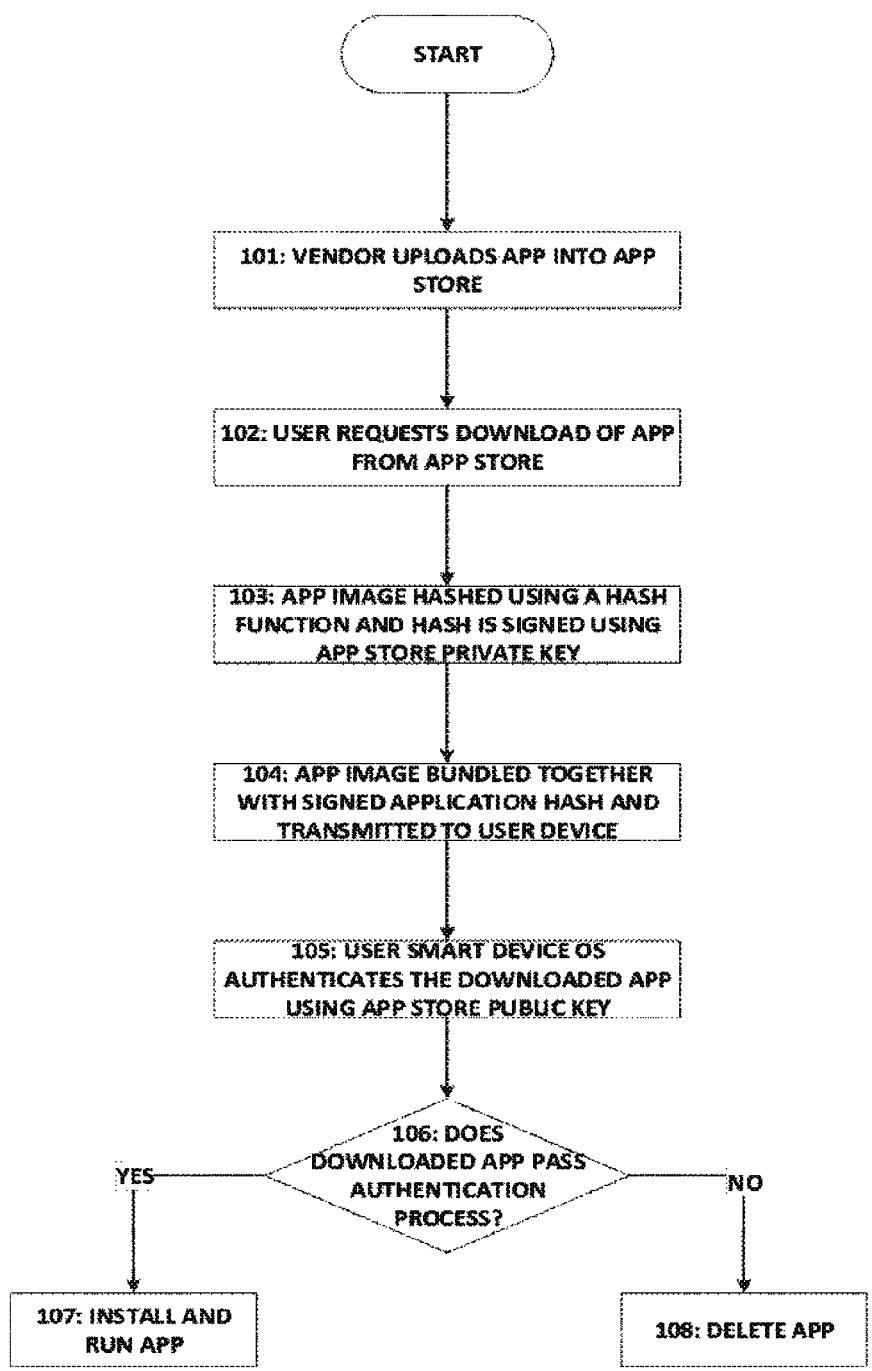
FIG. 1 illustrates a prior art application authentication process.
Figure 2:
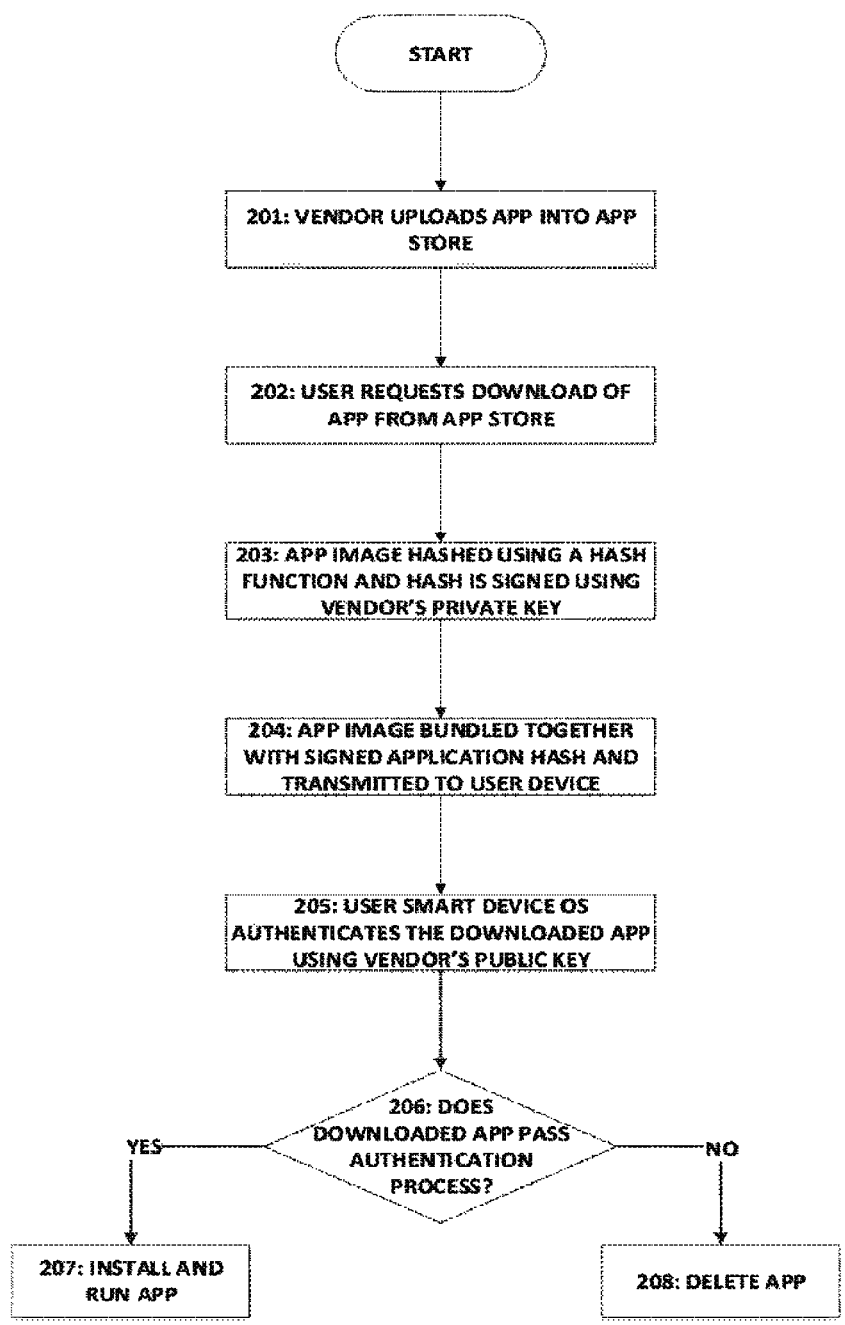
FIG. 2 illustrates a prior art process for signing an application using an application vendor's private key and public key.

Referring now to the drawings, wherein like reference numbers are used herein to designate like elements throughout, the various views and embodiments of a system and method for distribution of payment terminal software are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

The system and method that is the subject of the disclosure below addresses the issues outlined previously. It enables EFTPOS systems and smart devices to be configured with new payment applications. For example, this system and method enables the payment applications to be distributed to EFTPOS systems and smart devices used for mobile payments via smart device OS platform application stores, while alleviating the concerns of:

The extra authentication requirements associated with such applications;

Ensuring that the payment applications run only on the intended EFTPOS devices or smart devices used for payment purposes, and not on generic smart devices; and Allowing other applications to run on the intended EFTPOS devices or smart devices used for payment purposes.

Figure 4:
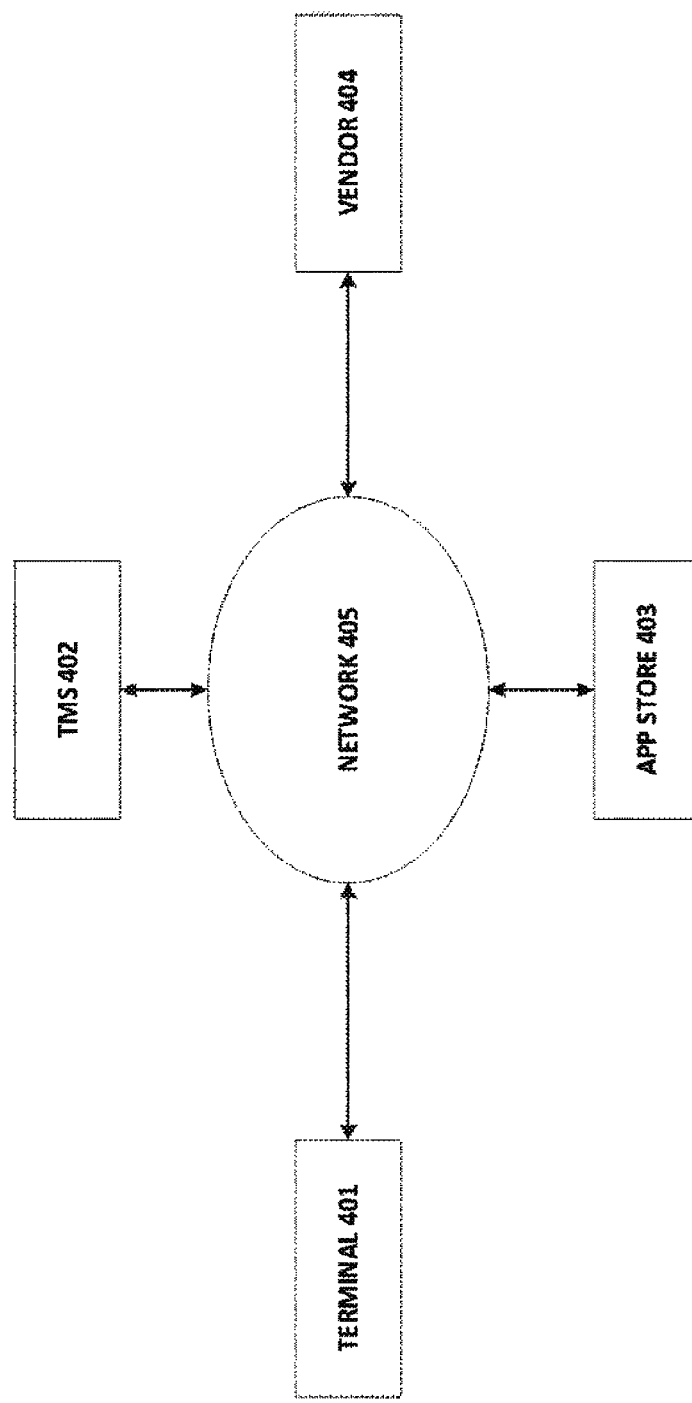
FIG. 4 illustrates an embodiment of a system and method for distribution of payment terminal software.

FIG. 4 shows an embodiment of the system and method 400 that is the subject of the current disclosure. Terminal 401 is a device for handling payments, for example, an EFTPOS terminal, or a smart device being used as an MPOS device.

Terminal Management Server (TMS) 402 performs the functions of acquiring and processing payment transactions from terminal 401, and communicating with terminal 401 to perform identification, verification, authorization and authentication functions. TMS 402 has capabilities to receive and transmit information and also perform encryption and decryption as necessary. In some embodiments, communications between TMS 402 and terminal 401 are performed using encrypted channels. Application store 403 stores one or more applications for vendors 404 to upload applications to. Applications are distributed from application store 403 to terminal 401. All of these are coupled to each other by network 405. Network 405 is constructed using one or more communication technologies known to those of skill in the art. These communication technologies include, for example, technologies related to a local area network (LAN), a campus area network (CAN), a metropolitan area network (MAN), a fiber optic network, a wireless network, a satellite communication link, a terrestrial communication link, a Bluetooth® communication link or a near field communication (NFC) link. In some embodiments, network 405 is comprised of one or more subnetworks. In some of these embodiments, some of the subnetworks are private. In some of these embodiments, some of the subnetworks are public. In some embodiments, communications within network 405 are encrypted.

Figure 5:
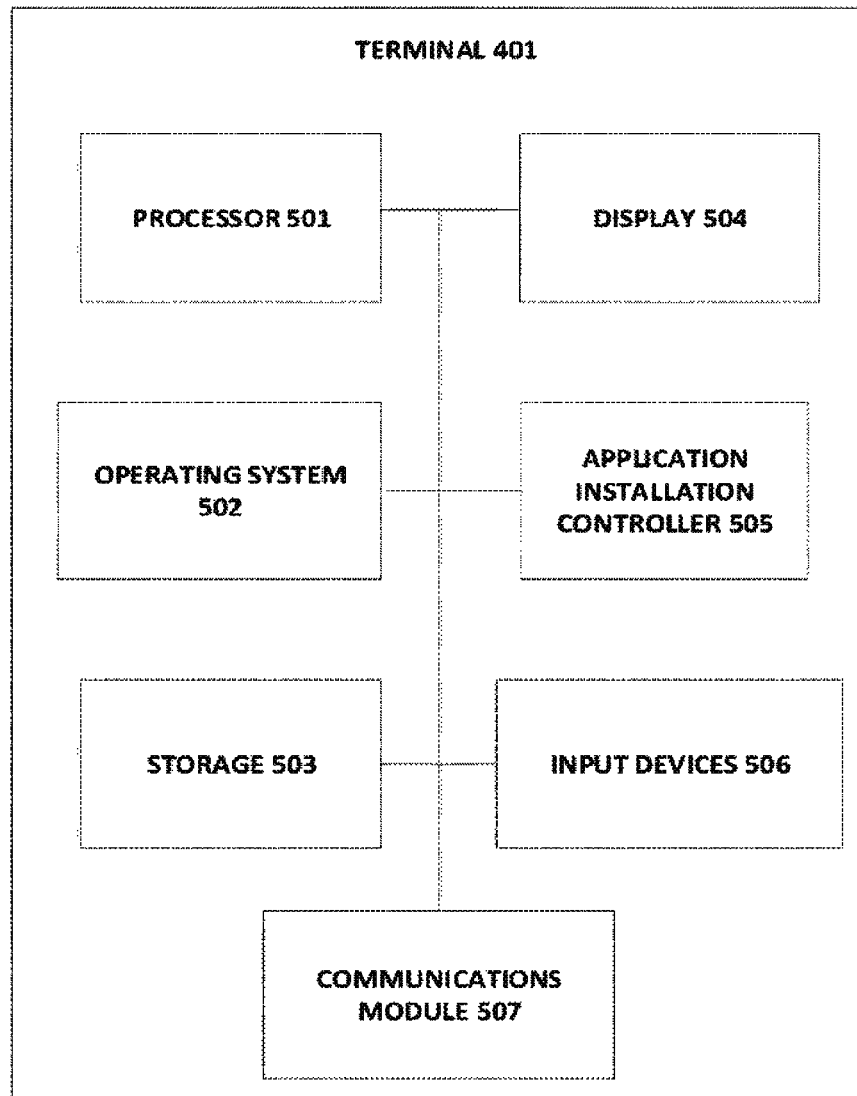
FIG. 5 shows an example embodiment of a terminal.

FIG. 5 shows an example embodiment of terminal 401. Terminal 401 comprises processor 501, OS 502, storage 503, display 504, application installation controller 505, input devices 506 and communications module 507. Examples of input devices 506 include keypads, keyboards, audio input devices, cameras and so on. Communications module 507 is capable of performing encryption of data prior to transmission and decryption of data after reception.

As explained above, in some embodiments, TMS 402 and terminal 401 communicate with each other over network 405 using encrypted channels. Examples of encryption techniques used include:

symmetric encryption techniques, such as those based on shared secrets, and asymmetric encryption techniques.

In some embodiments, terminal 401 communicates with TMS 402 to indicate to TMS 402 that it wants to install and run an application. The TMS 402 then performs the following functions:

Granting of authorization for terminal 401 to install and run the application, and Vendor-based authentication for terminal 401 to install and run the application.

The communications necessary to perform these functions are, as explained previously, encrypted.

Therefore, since only authorized devices would be able to communicate with the TMS 402 using an encrypted channel, this alleviates the concern of payment applications running on unauthorized devices such as generic smart devices. This also removes the need for extra authorization mechanisms such as out-of-band license keys.

Figure 3:
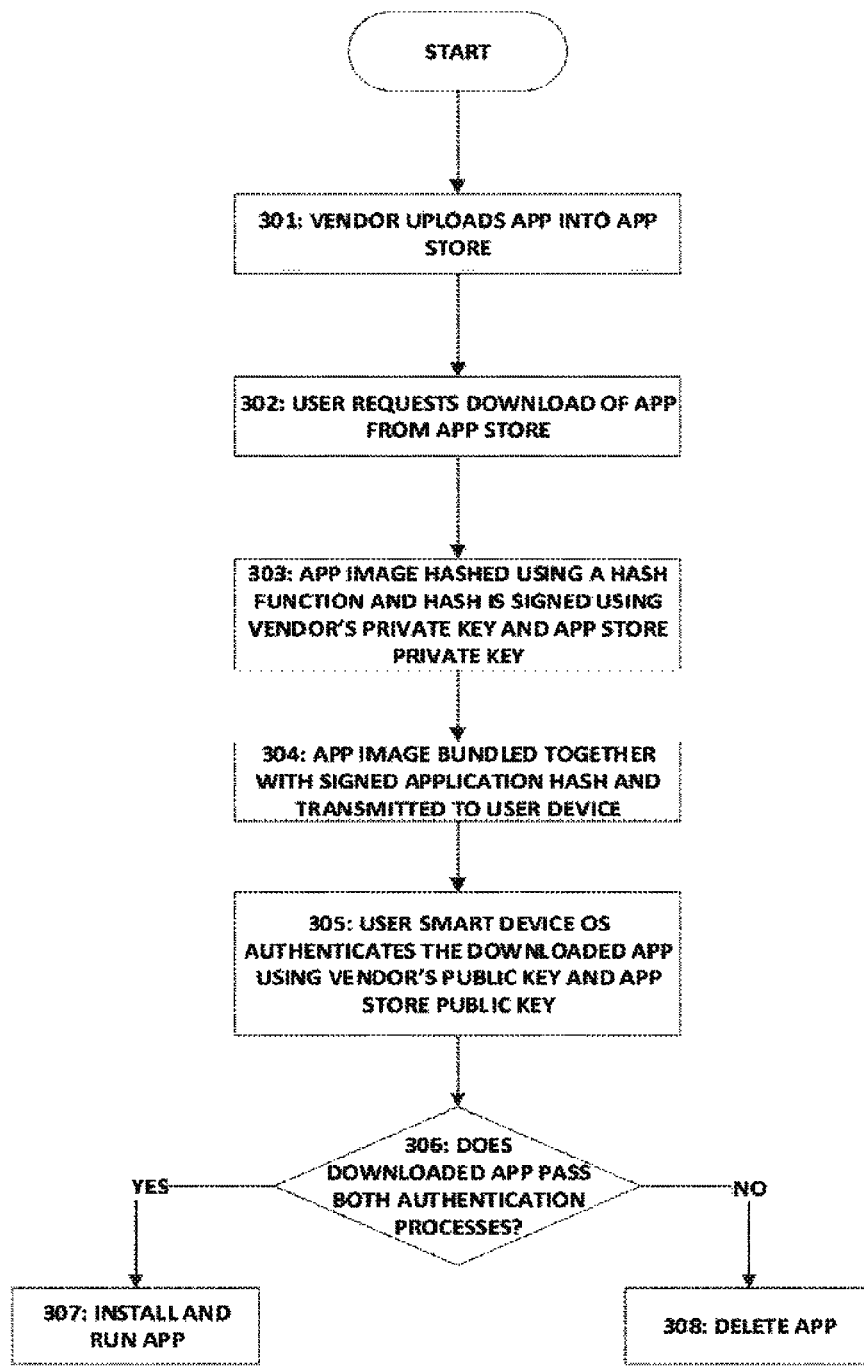
FIG. 3 illustrates a prior art process for signing applications using an application vendor's private key, the application store private key, the application vendor's public key and the application store public key.
Figure 6:
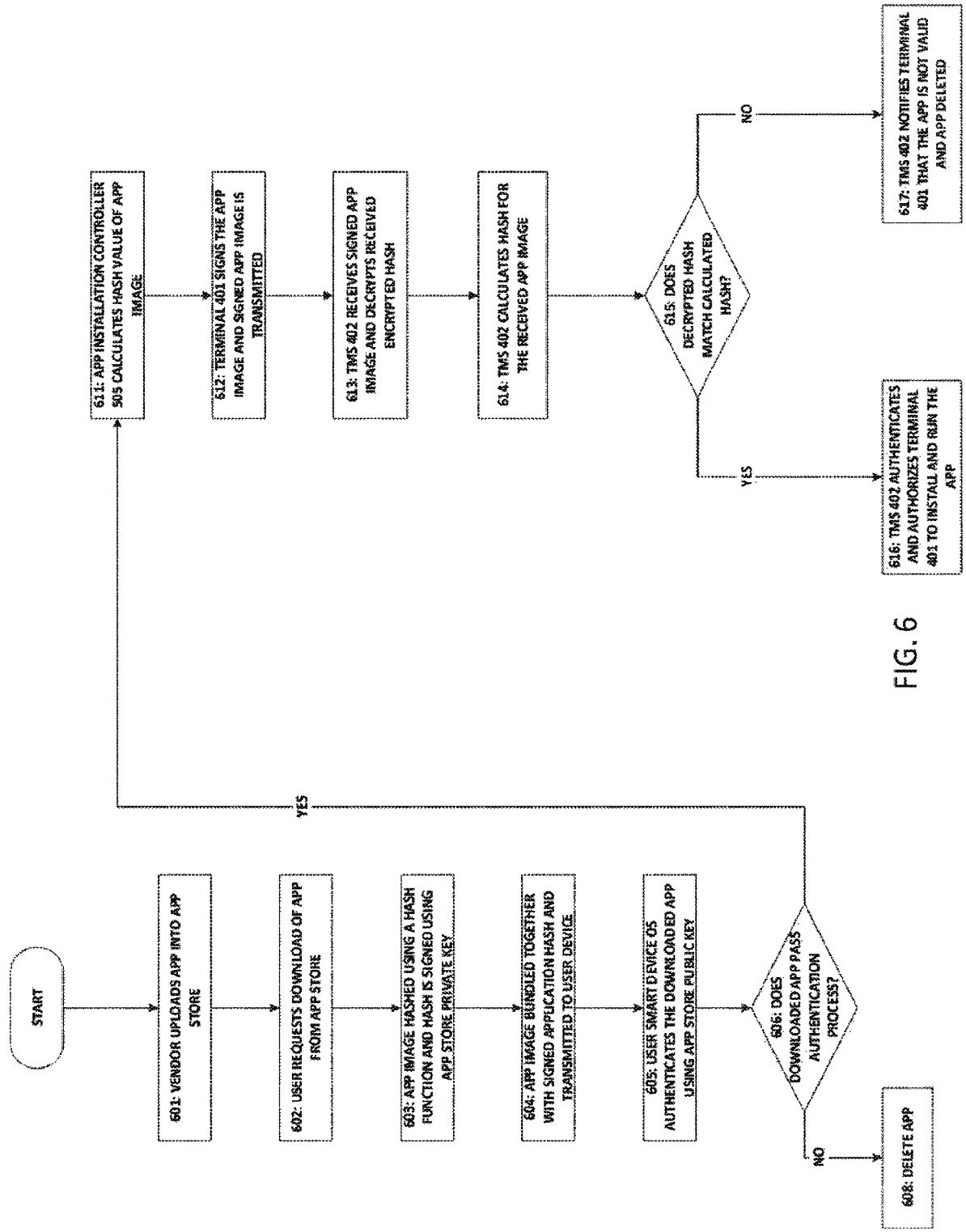
FIG. 6 illustrates an embodiment of a process for vendor distribution of applications.

An embodiment of a process for vendor distribution of applications including the TMS 402 providing authentication for terminal 401 before installation and running of the application is illustrated in FIG. 6. Steps 601 to 606 and 608 are identical to steps 101 to 106 and 108 of FIG. 1. However, in place of using an application vendor private key and an application vendor public key as shown in FIG. 3, steps 611 to 617 are performed. In step 611 of FIG. 6, the application installation controller 505 on terminal 401 calculates the hash value of the application image. This is performed using, for example, a hash function stored in storage 503 of terminal 401.

In step 612, the terminal 401 then signs the application image prior to transmission to the TMS 402. This step comprises encrypting the resultant hash by a unique-per-device key and submitting the signature together with the application image to TMS 402. In one embodiment, a symmetric key arrangement is used, that is, where TMS 402 uses the same key as terminal 401 for decryption. In one embodiment, the signing then utilizes a symmetric key or some means based on a shared secret for TMS 402 to derive such a symmetric key. An example is where TMS 402 derives a symmetric key from a base-key and a unique number from terminal 401.

In another embodiment, an asymmetric key arrangement is used, that is, where TMS 402 uses a different key to terminal 401 for decryption. An example embodiment would be where terminal 401 has a private key and sends the signature with a certification of its public key, so the TMS can verify and extract the terminal public key and use the terminal public key for verifying the signature.

Steps 613-617 concern the authorization and authentication steps performed by TMS 402. In step 613, TMS 402 receives the signed application image, and decrypts the received encrypted hash. In step 614, TMS 402 calculates a hash for the received application image using a stored hash function. In step 615, TMS 402 compares the two hash values. If the two hash values match each other, then in step 616 TMS 402 authenticates the application and authorizes the terminal 401 to install and run the application. If the two hash values do not match each other, then in step 617 TMS 402 instructs terminal 401 that the application is not valid.

While the above describes a situation where the key is unique per device, there are other possibilities. For example, the keys can be unique per account, unique per session or unique per download. This offers more security compared to the prior art where the keys are limited to being unique per application image.

Since the signature for vendor application authentication no longer needs to be bundled with the application download package, the application is transparent to the standard application store. This is because the process of downloading the application is then similar to the process of downloading other non-payment applications. This makes it easier to use a smart device OS application store for the purposes of distribution and managing of payment applications for terminals.

Figure 7:
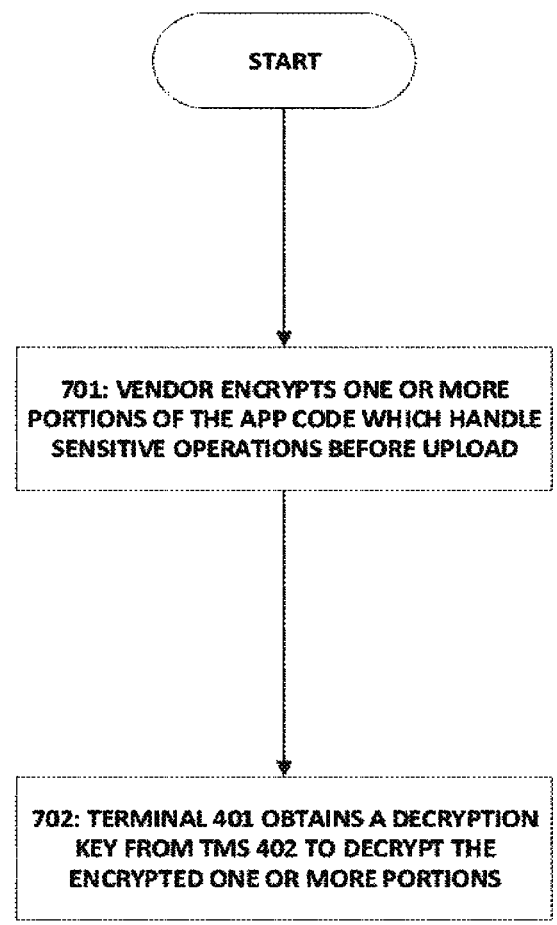
FIG. 7 illustrates an embodiment of a further measure to prevent a sensitive part of an application from running on an unauthorized device.

As the applications for the terminals are intended to be distributed in normal smart device platform application stores, such as the Google® Play store, devices other than terminals intended for payment may download and run the applications. This is not desirable. As explained above, one security measure is the requirement to communicate with TMS 402 over an encrypted channel. FIG. 7 shows an embodiment of a further security measure to prevent the sensitive part of the application from running on unauthorized devices. In FIG. 7:

The vendor 404 encrypts the one or more portions of the application code which handle sensitive operations prior to uploading the application to the application store, as shown in step 701, and Once the application is authenticated and authorized by the TMS 402 for installation and running on terminal 401 following the process of FIG. 6, the terminal 401 obtains a decryption key from the TMS 402 to decrypt the encrypted one or more portions of the application image in step 702.

Steps 701 and 702 work to prevent the protected code segment from being exposed outside the trusted terminal execution environment, and the protected code segment prevents the application from performing critical/sensitive operations in devices or platforms other than the intended terminals with the intended EFTPOS platforms.

In some embodiments, application class sandboxes are employed to protect system resources and applications from being accessed by unauthorized applications. In one embodiment, the applications are divided into 3 classes, each having a corresponding application class sandbox, so as to achieve segregation of applications based on level of authorization and type of application. In some embodiments, these application class sandboxes are employed in addition to, for example, existing Linux/Android sandboxes.

An example embodiment of this segregation into different classes followed by utilization of application level sandboxes is shown in FIG. 8. FIG. 8 shows the properties of each class in table 800. Row 801 of FIG. 8 corresponds to class A, row 802 of FIG. 8 corresponds to class B, and row 803 corresponds to class C. Column 804 describes the types of applications covered in each class, column 805 describes the security objective of each class, and column 806 describes the control means. For the remainder of this description each cell of the table 800 is denoted by (row, column). For example, the cell which indicates the type of application covered in class A is in the cell within row 801 and column 804, and will be denoted as (801, 804).

Class A covers authorized payment applications, as shown in cell (801, 804). Class B covers authorized non-payment applications as shown in cell (802, 804). Class C covers unauthorized applications as shown in cell (803, 804).

The security objectives for each class are different. For class A applications: As shown in cell (801,805), since these are authorized payment applications the OS does not restrict the access of these applications to sensitive data and functions. These applications are then placed in a relatively loose application class sandbox, with restrictions similar to, for example, the application sandbox in Security-Enhanced Linux (SE Linux), as shown in cell (801, 806).

For class B applications, as shown in cell (802, 805), the OS restricts the access of these applications to sensitive data and functions, such as the functions for reading finance card data, and certain related functions for cryptographic operations. Therefore, these applications will not be able to impact such sensitive assets. It significantly reduces the effort of application approval processes. The application class sandbox for class B applications therefore has restrictions on access to sensitive data and functions in addition to the restrictions of the application class sandbox for class A applications, as shown in cell (802, 806).

For class C applications, as shown in cell (803, 805), as the applications are not authorized by the vendor, in addition to the security objective for class B applications of restricting access to sensitive functions and data, the OS prevents these applications from requesting data from consumers and merchants, which may lead to security issues. Specifically, for EFTPOS, the risk with an unknown application is that the application can ask the user to enter authentication information such as a Personal-Identification-Number (PIN) or a card account number. In one embodiment, a combination of one or more techniques is used to warn the user not to enter such information when running a class C application. These warning techniques operate independently of the application and have the following effect: If there is an unauthorized application displaying misleading messages requesting sensitive information such as payment data to be entered into the application, then since the application cannot control the operation of these techniques, the user will then be warned not to enter sensitive information into the application. These methods include, for example:

Screen watermarking,
Screen flying stamp,
Screen status bar,
Screen border,
Screen overlay,
Dedicated light indicator,
Warning sound, and
Warning vibration.

The application class sandbox for class C applications therefore has extra restrictions when compared to the application class sandbox restrictions for class B applications.

It would be known to one of skill in the art that the approach described above and in FIG. 8 is generalizable to more than 3 classes.

In some embodiments, the operating system determines the class of the application being installed. The determination is based on, for example:

attribute field from the application,
the signing key of the application, or
the information from TMS 402 when the application is being authenticated.

Figure 9:
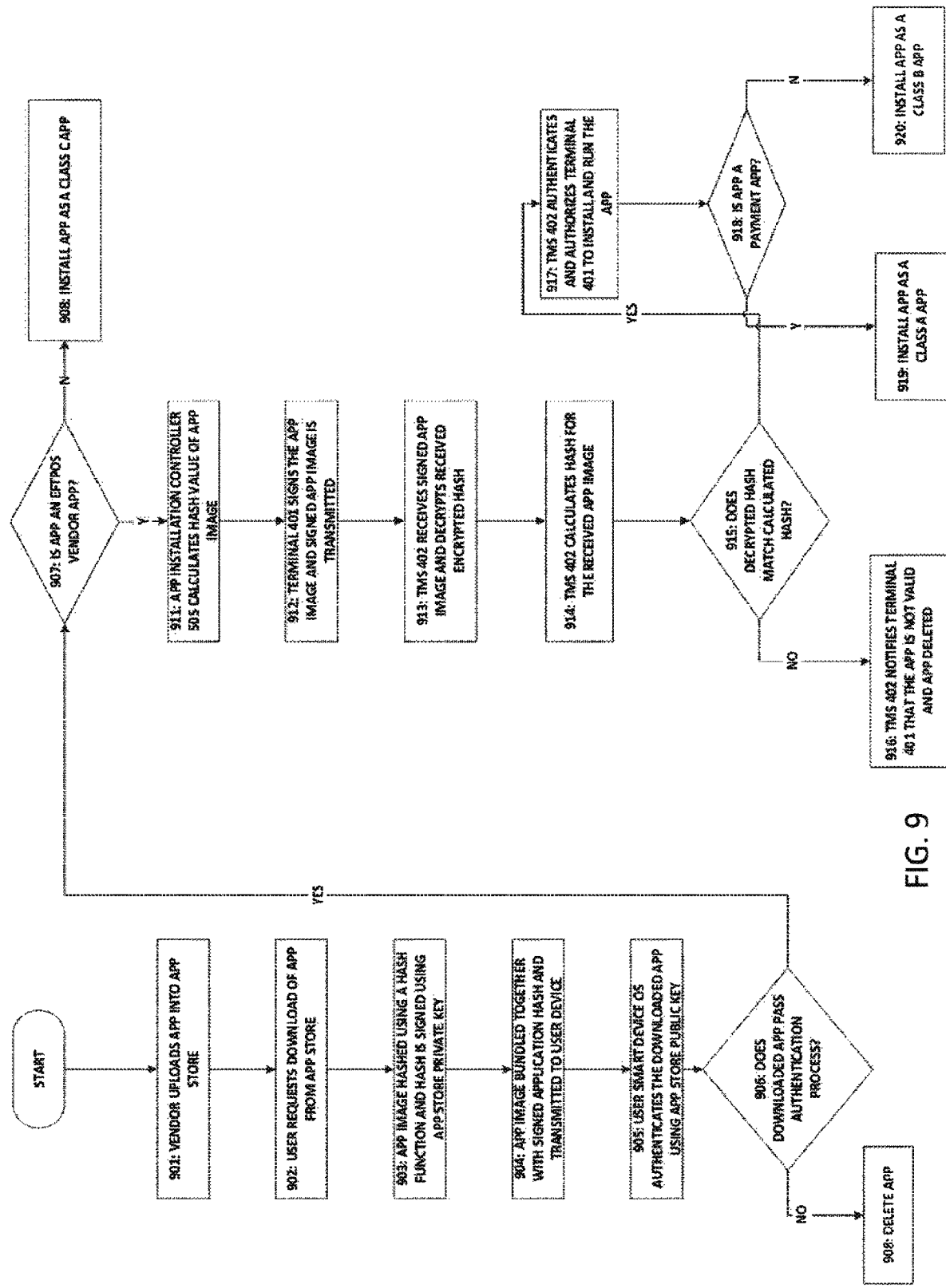
FIG. 9 illustrates an embodiment of a method for vendor upload of applications incorporating classification of applications so as to determine the relevant application class sandbox.

An embodiment of a method for vendor upload of applications incorporating classification of applications so as to determine the relevant application class sandbox is illustrated in FIG. 9. Steps 901 to 906 and 908 are identical to steps 601 to 606 and 608 of FIG. 6. If in step 906 the downloaded application passes the authentication process, then in step 907 a determination is made as to whether the application is an EFTPOS vendor application. If not, then in step 908 the application is installed as a class C application. If so, then step 911 is executed. Steps 911 to 917 are identical to steps 611 to 617 of FIG. 6. In step 918 a determination is made as to whether the application is a payment application. If it is a payment application in step 919 the application is installed as a class A application. If not, then in step 920 the application is installed as a class B application.

Typically applications may require patches for bugs and vulnerabilities, upgrades and introductions of new features. For EFTPOS vendors, traditionally these updates were distributed by terminal vendors, acquirers, or other third parties certified by electronic payment industrial standards. However, as the size of the new OS, updates and patches are significantly larger in size than ordinary EFTPOS firmware and software, it implies a heavy loading to the traditional terminal-management-system or other traditional distribution channels, which is very undesirable.

In one embodiment, the process outlined above in FIGS. 6 and 9 can be generalized to these other processes. This makes maintenance and updating of such applications easier as well, as most smart device OS application stores are better equipped for maintenance and updating of applications. Furthermore, this makes it easier to improve QoS, as smart device OS application stores have established procedures to improve QoS. Then, the authenticity, authority, integrity and sensitive code privacy can be assured by such methods.

One example embodiment includes a system to install and run an application for a terminal, said system comprising an application store and a terminal management server (TMS), wherein said TMS, application store and terminal are coupled to each other via a network, wherein a vendor uploads an application to said application store, and said terminal downloads said application via said network, and wherein after said downloading by said terminal, said TMS authorizes said terminal to install and run said downloaded application.

In one or more of the examples herein, after said application is downloaded by said terminal, said TMS authenticates said application.

In one or more of the examples herein, prior to said upload, said vendor encrypts one or more portions of said application, and said terminal obtains a decryption key from said TMS to decrypt said encrypted one or more portions after said authentication and authorization.

In one or more of the examples herein, said encryption is operative to prevent exposure of said one or more portions of said application outside a trusted environment.

In one or more of the examples herein, said encryption is operative to prevent the application from performing critical or sensitive operations in unauthorized platforms.

In one or more of the examples herein, said encryption is operative to prevent the application from performing critical or sensitive operations in unauthorized platforms.

One example embodiment includes a system to install and run an application for a terminal, said system comprising an application store, a terminal management server (TMS), wherein said TMS, application store and terminal are coupled to each other via a network, wherein a vendor uploads an application to said application store, and said terminal downloads said application via said network, wherein said downloaded application is classified into one of a plurality of classes, each of said plurality of classes corresponding to an application class sandbox, and said classification performed based on level of authorization and type of application.

In one or more of the examples herein, classification is based on at least one of an attribute field within said application, a signing key associated with said application, and information from a TMS when said application is being authenticated.

In one or more of the examples herein, at least one of said plurality of classes contains applications which are not related to payments.

In one or more of the examples herein, a first of said plurality of classes contains applications which are unauthorized and are not related to payments, wherein a first class is associated with an application class sandbox having restrictions on a user entering one or more pieces of sensitive information.

In one or more of the examples herein, one or more warning techniques are associated with said first class, wherein said one or more warning techniques operating independently of said applications contained within said first class, and wherein said one or more warning techniques are used to warn the user not to enter said one or more pieces of sensitive information.

In one or more of the examples herein, said classification is performed after said downloading.

One example embodiment includes a system to install and run an application for a terminal, said system comprising an application store, a terminal management server (TMS), wherein said TMS, application store and terminal are coupled to each other via a network, wherein a vendor uploads either a patch to an application to said application store, or an upgrade to an application to said application store, wherein said terminal downloads said patch or said upgrade via said network, and wherein after said downloading by said terminal, said TMS authorizes said terminal to install and run said patch or said upgrade.

One example embodiment includes a method for installing and running an application for a terminal comprising uploading an application to an application store, downloading, by a terminal, said application from said application store, wherein said terminal is connected to said application store by a network, and authorizing, by a TMS coupled to said terminal and said application store via said network, said terminal to install and run said downloaded application.

In one or more of the examples herein, the method further comprises authenticating, by said TMS, said application after said downloading.

In one or more of the examples herein, the method further comprises encrypting, by a vendor prior to said uploading, one or more portions of said application, and obtaining a decryption key from said TMS to decrypt said encrypted one or more portions after said authenticating and authorizing.

In one or more of the examples herein, said encrypting is operative to prevent exposure of said one or more portions of said application outside a trusted environment.

One example embodiment includes a method for installing and running an application for a terminal comprising uploading, by a vendor, an application to an application store, downloading, by a terminal, said application from said application store, wherein said terminal is connected to said application store by a network, and classifying said downloaded application into one of a plurality of classes, each of said plurality of classes corresponding to an application class sandbox, and said classifying performed based on level of authorization and type of application.

In one or more of the examples herein, classifying is based on at least one of an attribute field within said application, a signing key associated with said application, and information from a TMS when said application is being authenticated.

In one or more of the examples herein, at least one of said plurality of classes contains applications which are not related to payments.

In one or more of the examples herein, a first of said plurality of classes contains applications which are unauthorized and are not related to payments, wherein a first class is associated with an application class sandbox having restrictions on a user entering one or more pieces of sensitive information.

In one or more of the examples herein, said classifying is performed after said downloading.

One example embodiment includes a method for installing and running an application for a terminal comprising uploading, by a vendor, either a patch to an application to an application store, or an upgrade to an application to said application store, downloading, by a terminal, either said patch or said upgrade from said application store, wherein said terminal is connected to said application store by a network, and authorizing, by a TMS coupled to said terminal and said application store via said network, said terminal to install and run either said patch or said upgrade.

It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A system to install and run an application for a terminal, said system comprising:
    a terminal management server (TMS), wherein:
        said TMS and said terminal are coupled to each other via a network,
        an application store and said terminal are coupled to each other via said network,
        said TMS authorizes said terminal to install and run said application after said terminal downloads said application from said application store, wherein
            said application is uploaded to said application store by a vendor, wherein prior to uploading, one or more portions of said application that handle sensitive information are encrypted by said vendor,
            said terminal uses a public key of the application store to authenticate the downloaded application, and in response to the authentication, sends the TMS an image of the downloaded application and a signature generated from the image, wherein the signature comprise an encryption of a hash value computed by the terminal of the downloaded application,
        said authorization comprises determining that the generated hash value matches the received hash value, and in response to said authorization, said TMS provides a decryption key of the vendor to said terminal to decrypt the one or more portions of said application to enable the application to handle the sensitive information.

2. The system of claim 1, wherein said encryption of said application is operative to prevent exposure of said one or more portions of said application outside a trusted environment.

3. The system of claim 1, wherein said encryption of said application is operative to prevent the application from performing critical or sensitive operations in unauthorized platforms.

4. The system of claim 1, wherein said terminal classifies said application into one of a plurality of classes, wherein said classification occurs after said terminal downloads said application from said application store,
    each of said plurality of classes corresponds to an application class sandbox, and
    wherein said classification is based on:
        a signing key associated with said application; and
        information provided by said TMS when said application is being authenticated.

5. The system of claim 4, wherein at least one of said plurality of classes contains applications which are not related to payments.

6. The system of claim 4, wherein a first class of said plurality of classes contains applications which are unauthorized and are not related to payments.

7. The system of claim 6, wherein one or more warning techniques are associated with said first class.

8. The system of claim 6, wherein said first class is associated with an application class sandbox having restrictions on a user entering one or more pieces of sensitive information.

9. The system of claim 7, wherein said one or more warning techniques are based on at least one of:
    a screen watermark;
    a screen flying stamp;
    a screen status bar;
    a screen border;
    a screen overlay;
    a dedicated light indicator;
    a warning sound; and
    a warning vibration.

10. The system of claim 7, wherein said one or more warning techniques operate independently of said applications contained within said first class.

11. The system of claim 10, wherein said one or more warning techniques are used to warn a user not to enter one or more pieces of sensitive information.

12. The system of claim 1, wherein:
    said TMS is coupled to said vendor via said network; and
    said TMS receives said decryption key from said vendor.

13. The system of claim 1, wherein the signature is generated using a symmetric encryption key, and wherein said TMS derives a symmetric encryption key from a base key and a unique number received from the terminal, and the TMS uses the derived symmetric encryption key to decrypt the encryption of the hash value.

14. The system of claim 1, wherein the signature is generated using a private encryption key of the terminal, and wherein said TMS uses a unique terminal-specific key to decrypt the encryption of the hash value.

15. A method for installing and running an application for a terminal comprising:
    downloading, by the terminal, the application from an application store, wherein said application is uploaded to said application store by a vendor, wherein one or more portions of said application that handle sensitive information are encrypted by said vendor prior to said uploading;
    authenticating by the terminal, the downloaded application using a public key of the application store;
    in response to the authentication sending, by the terminal to a terminal management server (TMS) an image of the downloaded application and a signature generated from the image, wherein the signature comprise an encryption of a hash value computer by the terminal of the downloaded application;

in response to receiving the image and the signature, decrypting, by the TMS, the encryption of the hash value to generate a received has value;

generating a hash value from the image using a has function;

comparing the generated hash value with the received hash value;

authorizing the terminal to install and run the application in response to determining that the generated hash value matches the received has value; and providing, by the TMS, a decryption key of the vendor to said terminal to decrypt the one or more portions of said application to enable the application to handle the sensitive information.

16. The method of claim 15, wherein said encrypting said one or more portions of said application is operative to prevent exposure of said one or more portions of said application outside a trusted environment.

17. The method of claim 15, further comprising:

receiving, by said TMS, said decryption key from said vendor.

* * * * *